United States Patent
Pickel

(10) Patent No.: US 7,121,821 B2
(45) Date of Patent: Oct. 17, 2006

(54) DEVICE FOR HEATING PREFORMS PROVIDED WITH SUPPORTING RING

(75) Inventor: Herbert Pickel, Neutraubling (DE)

(73) Assignee: Krones AG, Neutraubling (DE)

( * ) Notice: Subject to any disclaimer, the term of this patent is extended or adjusted under 35 U.S.C. 154(b) by 94 days.

(21) Appl. No.: 10/433,007

(22) PCT Filed: Sep. 6, 2002

(86) PCT No.: PCT/EP02/09995

§ 371 (c)(1),
(2), (4) Date: Apr. 2, 2004

(87) PCT Pub. No.: WO03/024693

PCT Pub. Date: Mar. 27, 2003

(65) Prior Publication Data

US 2004/0161486 A1 Aug. 19, 2004

(30) Foreign Application Priority Data

Sep. 14, 2001 (DE) ................................ 101 45 456

(51) Int. Cl.
*B29C 49/68* (2006.01)
(52) U.S. Cl. .................. 425/174.4; 425/526; 425/534; 264/458; 264/535
(58) Field of Classification Search ............. 425/174.4, 425/526, 534; 264/458, 535
See application file for complete search history.

(56) References Cited

U.S. PATENT DOCUMENTS

| | | | |
|---|---|---|---|
| 4,420,670 A | | 12/1983 | Croswell et al. |
| 4,571,173 A | | 2/1986 | Chang et al. |
| 4,606,723 A | | 8/1986 | Pasternicki |
| 5,066,222 A | * | 11/1991 | Roos et al. .................... 432/5 |
| 5,282,526 A | * | 2/1994 | Gibbemeyer ................ 198/376 |
| 5,620,715 A | * | 4/1997 | Hart et al. ................... 425/143 |
| 5,869,110 A | * | 2/1999 | Ogihara ...................... 425/526 |
| 6,109,907 A | * | 8/2000 | Takada et al. ............... 425/526 |

FOREIGN PATENT DOCUMENTS

| | | |
|---|---|---|
| DE | 3908345 C1 | 1/1991 |
| DE | 29916315 | 7/2000 |
| EP | 1095756 A2 | 5/2001 |
| GB | 2095611 B1 | 10/1982 |
| WO | WO 01/34369 A1 | 5/2001 |
| WO | WO 01/49075 * | 7/2001 |
| WO | WO 03/024693 A1 | 3/2003 |

* cited by examiner

*Primary Examiner*—Joseph S. Del Sole
*Assistant Examiner*—Maria Veronica Ewald
(74) *Attorney, Agent, or Firm*—Marshall, Gerstein & Borun LLP

(57) ABSTRACT

A device for heating parisons made of a thermoplastic material and having a supporting ring for blow molding hollow bodies, having a conveyor means, a plurality of holding means which are arranged on the conveyor means and grip the head area of the parisons between the supporting ring and the mouth and radiant heaters arranged on the path of movement of the parisons carried by the holding means, a shield supported by the conveying means being assigned to each holding mandrel in the form of a cover plate which is located at the height of the supporting ring and has a borehole to receive the supporting ring. Furthermore, there is also a cooling device, which acts directly on the exposed head area. This permits optimum protection of the head area of the parisons, which is not to be shaped or deformed, to prevent unacceptable heating.

6 Claims, 3 Drawing Sheets

DEVICE FOR HEATING PREFORMS PROVIDED WITH SUPPORTING RING

FIELD OF THE INVENTION

This invention relates to a heating apparatus for heating parisons formed of thermoplastic material, such as used for forming beverage bottles in bottling operations.

BACKGROUND OF THE INVENTION

British Patent 2 095 611 B has already disclosed such a device with which the parisons are gripped on the outside in the head area by means of holding fingers between the supporting ring and the open mouth and the shielding is formed by a cylindrical protective jacket which surrounds most of the head area including the supporting ring. Although the parison head area, which is not to be deformed, is protected from direct heating by the radiant heater due to this protective jacket, it is not protected from indirect heating by the protective jacket, which is itself heated by the radiant heaters.

British Patent 2 095 611 B has already disclosed such a device with which the parisons are gripped on the outside in the head area by means of holding fingers between the supporting ring and the open mouth, and the shielding is formed by a cylindrical protective jacket which surrounds most of the head area including the supporting ring. Although the parison head area, which is not to be deformed, is protected from direct heating by the radiant heater due to this protective jacket, it is not protected from indirect heating by the protective jacket, which is itself heated by the radiant heaters.

SUMMARY OF THE INVENTION

The object of this invention is to improve upon the protection of the head area of parisons, which is not to be deformed, to protect it from unwanted heating in the case of a generic device.

In the case of a device according to this invention, the head area of the parisons is protected by the cover plates from direct heating due to the radiant heaters. In addition, indirect heating via the closed protective sleeves (not included) is prevented, and instead an active cooling of the head and thread areas is implemented. Because of the continuous shielding by the cover plates, which form a type of strip, this makes it possible to heat the area of the parisons, which is to be heated especially rapidly and in an energy saving manner in a closed heating channel, and to do so while the parisons are in the normal upright position.

BRIEF DESCRIPTION OF THE DRAWINGS

An exemplary embodiment of the present invention is described below on the basis of drawings, which show.

DETAILED DESCRIPTION OF THE INVENTION

Figure 1:
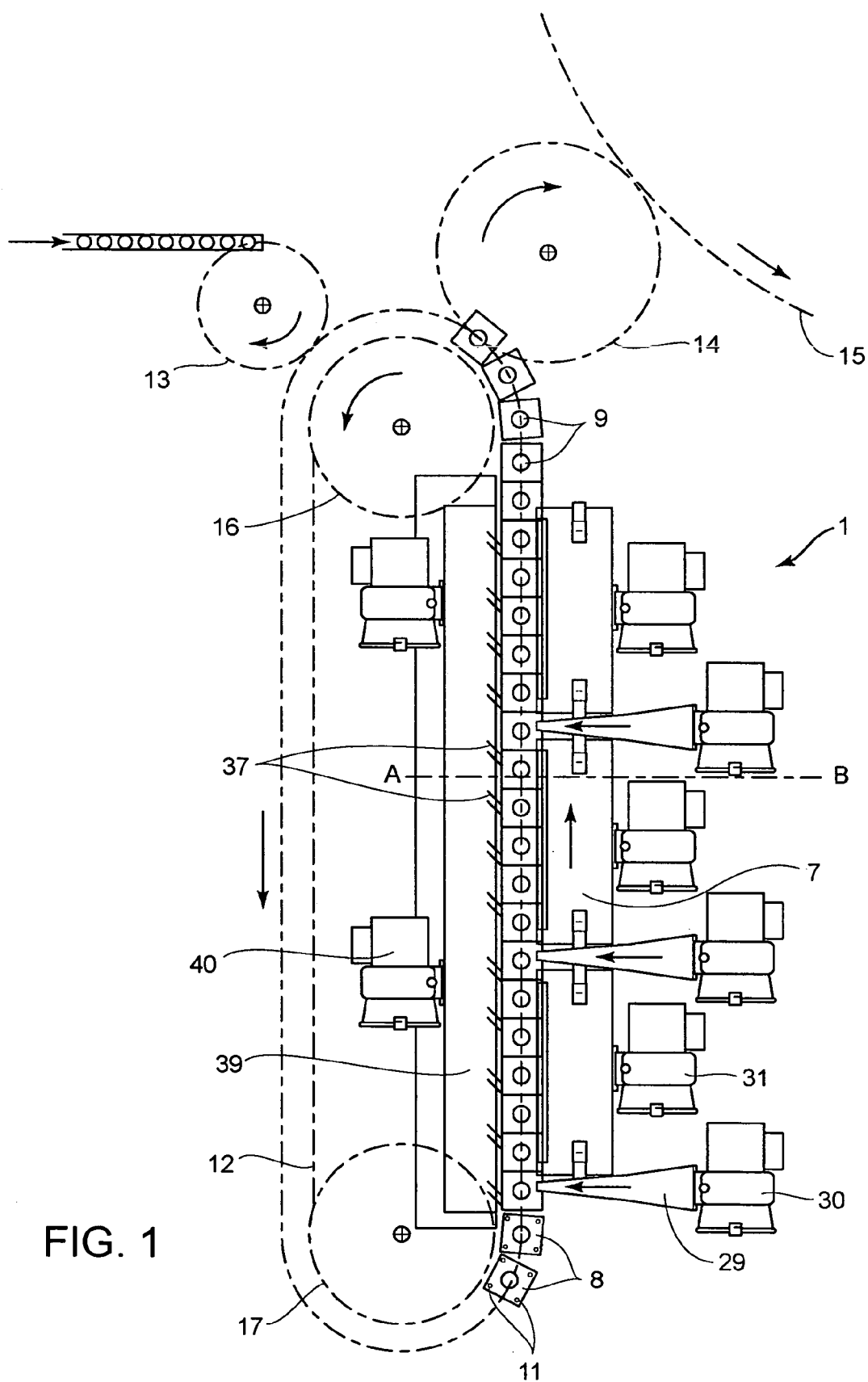
FIG. 1 a schematic top view of a device for heating a parison.

The device 1 according to FIGS. 1 through 4 is set up for heating parisons 2 made of PET, supplied at room temperature, to the processing temperature between approximately 90° C. and 110° C., which is required for stretch blow molding. It is integrated into a stretch blow molding machine, which is shown only schematically and in part, with a feeder star 13, a transfer star 14 and a blowing wheel 15, where hollow bodies in the form of beverage bottles are produced from the preheated parisons 2 by stretch blow molding.

The parisons 2, which are closed at the bottom, have a supporting ring 3 in their upper area, and the head 5, which is located between the open mouth 4 and the supporting ring 3, has an external thread and is already in its final form. The head 5 is not involved in the stretch blow molding operation and therefore must not be heated in any case to a temperature close to the processing temperature in order to avoid unwanted deformation.

The device 1 has a continuous conveyor chain 12 having a plurality of chain links 12a of the same type which are joined together by pins in an articulated manner and have laterally protruding projections 12b, which revolve in a horizontal plane over a driving wheel 16 and a deflecting wheel 17. Between the driving wheel 16 and the deflecting wheel 17, there are two parallel linear revolving regions, which move around the wheels and in which the chain links 12a are guided precisely by means of stationary rails 19 and rollers 18, which are mounted on the chain links so they can rotate.

In at least one of the two linear revolving regions, a plurality of similar stationary heating boxes 7 are situated on the path of movement of the parisons 2, which are carried by the conveyor chain 12, each box being equipped with a plurality of horizontally aligned tubular infrared lamps 36.

Figure 2:
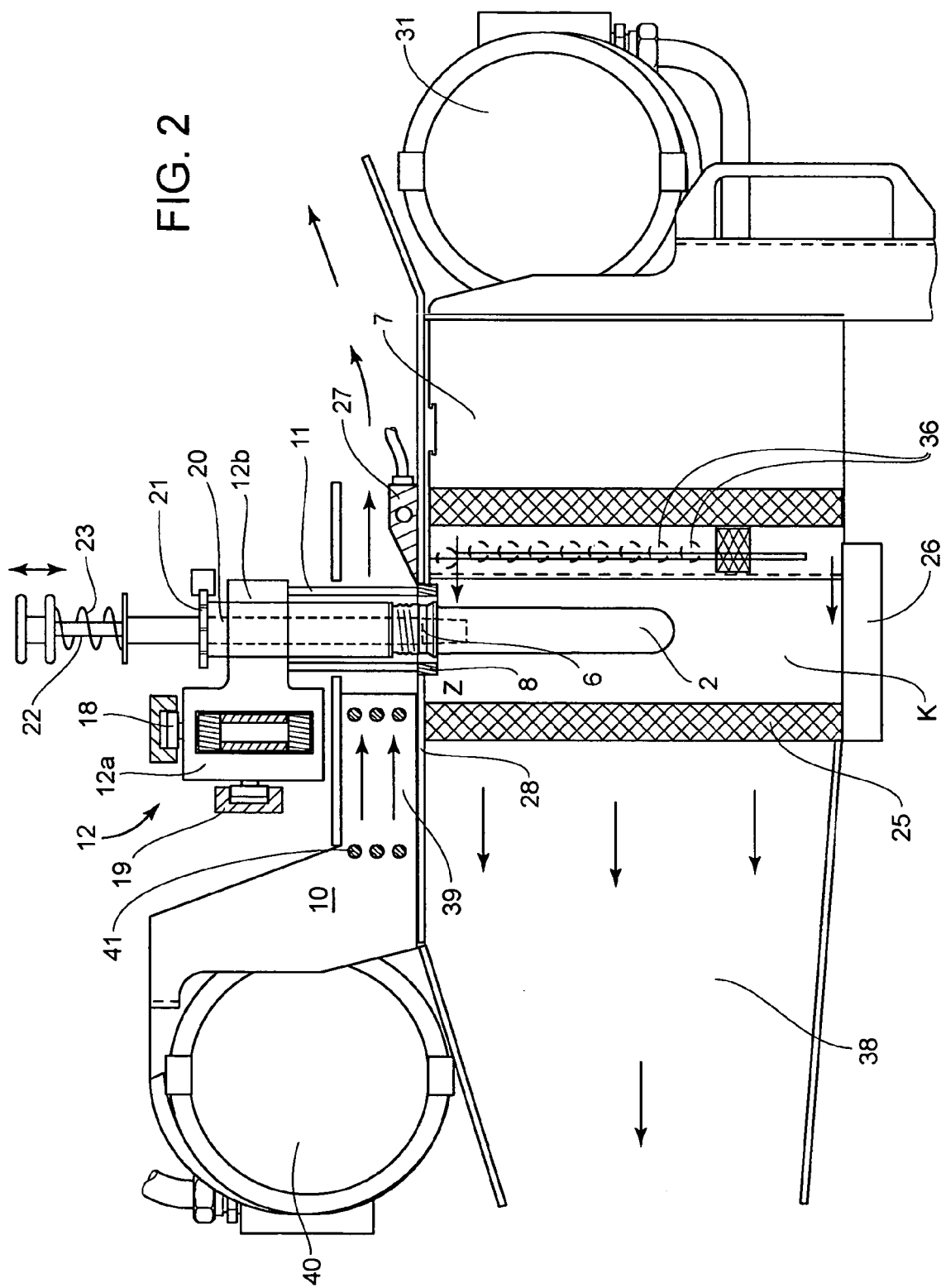
FIG. 2 section A–B according to FIG. 1.

A sleeve 20 having a vertical rotational axle is mounted in each projection 12b of the conveyor chain 12 and is connected in a rotationally fixed manner to a toothed wheel 21; it engages with a stationary toothed rack or a continuously revolving roller chain 21 and sets the sleeve 20 in continuous rotation when the conveyor chain 12 is rotating continuously. A holding mandrel 6 is accommodated in each sleeve 20 in a rotationally fixed manner but with an adjustable height. The holding mandrel projects out of the bottom side of the sleeve 20 and is rigidly connected to a control rod 22 which projects at the upper end of the sleeve 20. A compression spring 23 which presses the holding mandrel 6 into its upper end position shown in FIGS. 1 and 2 is inserted between the broadened end of the control rod 22 and the sleeve 20, this position being defined by stops (not shown). With the help of control rod 22 and stationary curve ramps (not shown), the holding mandrel 6 may be moved into its lower end position (indicated with a dash-dot line in FIG. 2) against the force of the compression spring 23. This lifting movement serves to introduce the holding mandrel, which is equipped with a spring ring, into the open mouth 4 of the parison 2 in the area of the feeder star 13 and for extraction out of the mouth 4 in the area of the transfer star 14.

On the lower side of each projection 12b of the conveyor chain 12, a horizontal cover plate 8 having a square periphery is attached at a distance by means of four thin perpendicular rods 11. The cover plate 8 consists of an essentially flat piece of sheet metal several millimeters thick or a profiled molded part, and it has a central borehole 9, which is concentric with the sleeve 20 and the holding mandrel 6. The diameter of the borehole 9 is slightly greater than the outside diameter of the supporting ring 3. The height and thickness of the cover plates 8 are selected so that the supporting ring 3 of a parison 1 is situated centrally in the borehole 9 at a slight distance of 2 to 3 mm, for example, from the bottom side of the cover plate, and most of the head 5 projects above the top side of the cover plate 8 and is thus freely accessible from practically all sides between the four rods when the holding mandrel 6 with the parison 2 placed on it assumes its upper end position (see FIG. 4). In the lower end position, however, there is a parison 2, which is to be gripped or released by the holding mandrel 6, with its mouth 4 situated at a slight distance beneath the cover plate 8.

Figure 3:
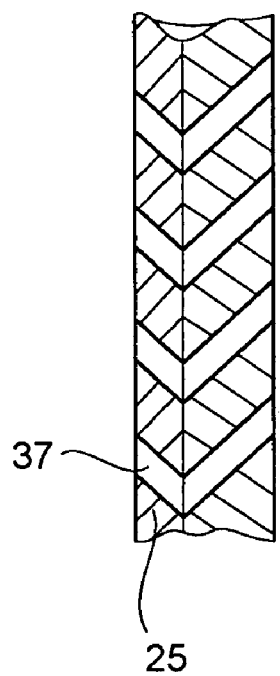
FIG. 3 a vertical section through a reflector belonging to the device according to FIGS. 1 and 2.
Figure 4:
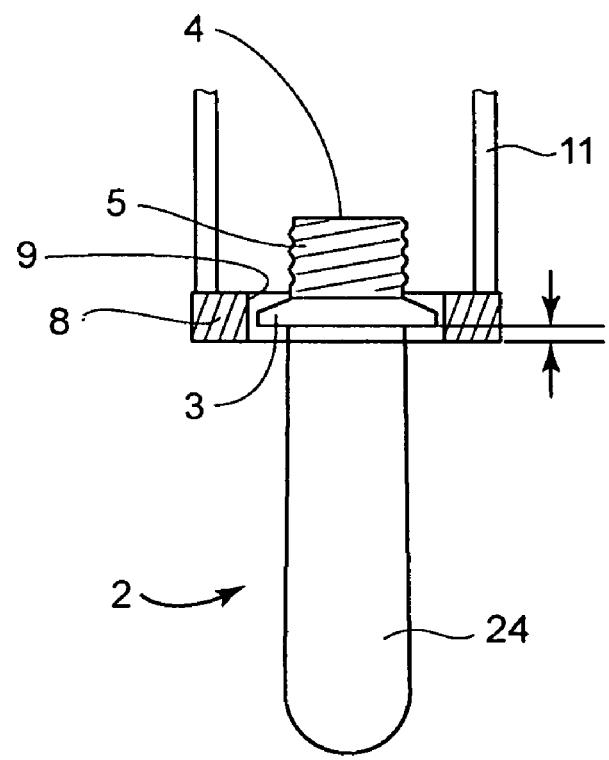
FIG. 4 the detail Z according to FIG. 2 in an enlarged diagram.

The heating boxes 7, which are arranged in a line on the outside of the linear peripheral area of the conveyor chain 12, form a linear heating channel K together with plate-shaped ceramic reflectors 35, which are arranged in a line on the inside of the linear revolving area, and a ceramic base plate 26; the parisons 2, which are conveyed in the normal upright position, project from above with their body area 24 which is to be shaped, into the linear heating channel. The heating channel K is closed at the upper end by the cover plates 8, which come in contact with one another or are opposite one another at a slight distance and form a revolving belt of cover plates in combination with a linear cooling shield 27 through which water flows on the side of the heating boxes 7 and a baffle plate 28 on the side of reflectors 25. The linear edges of the cooling shield 27 and the baffle plate 28, which point toward one another and run parallel to one another are arranged at a small distance from the cover plates 8 or they come in contact with the latter. Due to the design of a heating channel K, which is closed on all sides, this permits an extremely effective and energy-saving heating for the body area 26, which is to be shaped beneath, the supporting ring 3 of the parisons 2. To prevent overheating of the surface of the parisons 2, narrow slotted nozzles 29 are provided between the heating boxes 7 with fans 30 connected to them, to blow room air in a high concentration onto the surfaces of the parisons 2 as they revolve past them. Furthermore, a cooling fan 31 is connected to the outside of each heating box 7 to cool the infrared lamps 36. The air which is introduced by the fans 30 and 31 into the heating channel K at an excess pressure is removed through perpendicular slot-shaped orifices 37 provided between the individual reflectors 25. These orifices 37 are either positioned in a single inclination relative to the direction of emission of the infrared lamps 36, as shown in FIG. 1, or they are positioned so that there are two inclinations, as shown in FIG. 3. This prevents the thermal radiation emitted by the infrared lamps 36 from being able to escape directly through the orifices 37. The orifices 37 open into a collecting channel 38 through which the heated air from the heating channel K coming from the fans 30, 31 is discharged from the device 1 in a controlled manner. Because of the arrangement described here, the head 5 of each parison 2 is situated completely outside of the heating channel K and is protected optimally from direct heating by the infrared lamps 36 due to the cover plates 8, which are carried by the conveyor chain 12. To prevent any indirect heating by heated parts of a device, etc., a separate cooling system 10 is provided for the heads 5. It has one or more nozzles 39 which are situated on the inside of the linear peripheral area of the conveyor chain 12 and supply ambient air through fans 40. If necessary, a heat exchanger 41 which has a coolant flowing through it may also be provided in the nozzles 39. Intense cooling of the head 5 of the parison 2, which is freely accessible for the most part, is achieved by the cooling device 10. In addition, this also cools the adjacent parts of the device 1, such as the holding mandrels 6, etc. The air is guided by appropriate baffle plates in countercurrent with the air flow in the heating channel K and to some extent also through the cooling shield 27.

The cover plates according to this invention can be used in the same way with parisons in which the supporting ring is not formed on a projecting neck collar, but instead on a recessed ring groove, especially shaped transition between the head and the body, etc. It is important only that the cover plate be arranged at the dividing point between the area of the parison to be shaped further and that which is not to be shaped further.

If the parisons are heated in the normal upright position, as shown in this embodiment, the cover plates according to this invention also prevent heating of the head area due to hot air ascending out of the heating channel. The parisons can therefore be heated with no problem in a normal position without first rotating them by 180°.

I claim:

1. A device for heating parisons (2) made of a thermoplastic material for blow molding hollow bodies and having a body area (24), a supporting ring (3), a mouth (4), and a head area (5), comprising a conveyor means (12), a plurality of holding means (6) which are situated on the conveying means and grip the head area (5) of the parisons between the supporting ring and the mouth (4), radiant heaters (36) arranged on the path of movement of the parisons which are carried by the holding means, a shield carried by the conveying means provided for each holding means to protect the head area of each parison, which is situated between the supporting ring and the mouth, from heating each shield being formed by a cover plate (8) arranged at the level of the supporting ring (3) and having a borehole (9) that surrounds the supporting ring (3) at a small distance, thereby leaving most of the head area (5) of the parisons (2) free, and a cooling device (10) which acts on the exposed head area (5) of the parison (2), wherein each cover plate (8) is designed in the manner of a plate and is connected by at least one rod (11) to the conveyor means (12) and the cooling device (10) has at least one air blowing nozzle (39) directed at the head (5) of the parisons (2).

2. The device according to claim 1, wherein the conveyor means are formed by a continuous conveyor chain (12) having at least one linear revolving area in which the radiant heaters (36) are arranged, the cover plates (8) have one of a rectangular and square periphery, and adjacent cover plates (8) one of contact one another in the linear revolving area of the conveyor chain (12) and they are opposite one another with a slight distance between them.

3. The device according to claim 2, wherein the parisons (2) are transported in a freely suspended manner in an upright normal position with the mouth facing upward on holding mandrels (6), and with their body area (24) they are immersed in a heating channel (K) comprising a radiant heater (36) and diametrically opposed reflectors (25), the heating channel being covered at the top by the cover plates (8).

4. The device according to claim 3, wherein a plurality of cooling fans (30,31) are connected to the heating channel (K) on the side of the radiant heaters (36), and orifices (37) for removing the cooling air from the heating channel (K) are provided on the side of the reflectors(25).

5. The device according to claim 1, and a heat exchanger (41) through which a coolant flows is arranged in the air blowing nozzle (39).

6. The device according to claim 1, wherein the holding means are formed by holding mandrels (6) which are arranged on the conveyor means (12) in such a way that they are adjustable in height and can be inserted beneath the mouth (4) of the parisons (2).

* * * * *

UNITED STATES PATENT AND TRADEMARK OFFICE
CERTIFICATE OF CORRECTION

| | | |
|---|---|---|
| PATENT NO. | : 7,121,821 B2 | Page 1 of 1 |
| APPLICATION NO. | : 10/433007 | |
| DATED | : October 17, 2006 | |
| INVENTOR(S) | : Herbert Pickel | |

It is certified that error appears in the above-identified patent and that said Letters Patent is hereby corrected as shown below:

Title Page
Column One
Item (54): Title
Please delete:
"DEVICE FOR HEATING PREFORMS PROVIDED WITH SUPPORTING RING"

and insert
-- DEVICE FOR HEATING PARISONS PROVIDED WITH A SUPPORTING RING --
in its place.

Signed and Sealed this

Eighth Day of May, 2007

JON W. DUDAS
*Director of the United States Patent and Trademark Office*